May 21, 1929.  R. B. McWHIRTER  1,714,391
EXERCISE BAR
Filed March 23, 1927
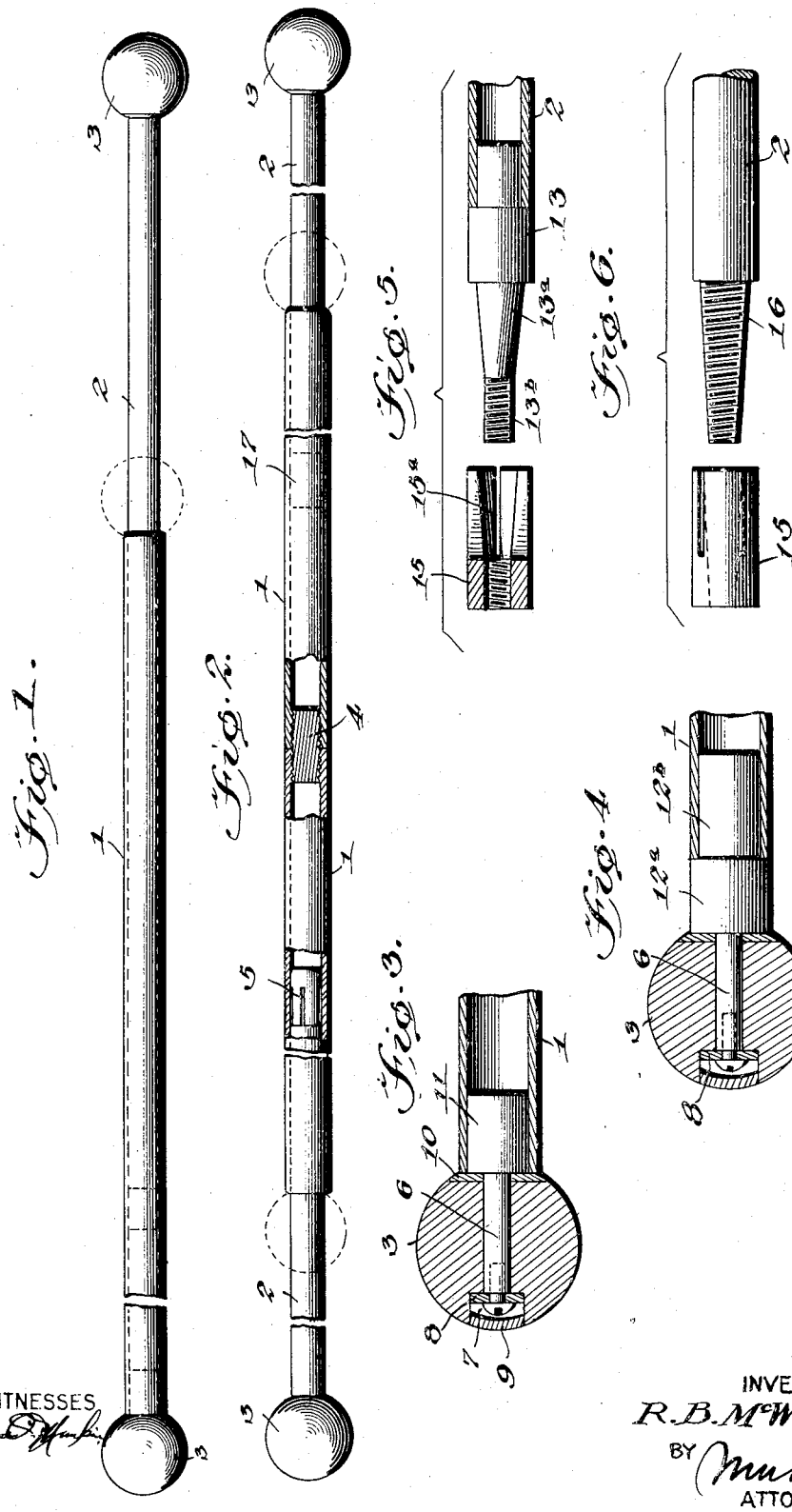
INVENTOR
R. B. McWhirter,
BY
ATTORNEYS Patented May 21, 1929.

1,714,391

UNITED STATES PATENT OFFICE.

ROBERT B. McWHIRTER, OF POINT PLEASANT, WEST VIRGINIA.

EXERCISE BAR.

Application filed March 23, 1927. Serial No. 177,712.

This invention relates to an exercise bar or wand and has for its object the provision of extensible means for the bar so that it can be extended and collapsed during the exercising movements of the user, or may be made into a rigid bar of any given length.

A further object is to provide a strong durable construction and to provide thereon more or less flexible ends.

In the drawings,

Figure 1 shows one form of the device from the side or top or bottom,

Fig. 2 shows a similar view of a modification of the device, partly in section,

Figs. 3 and 4 show partly sectional views of the ends of the bar, and

Figs. 5 and 6 show details of the means provided for sliding the extensions in and out and which means may also be used to lock the bar in various positions.

In Figs. 1 and 2, 1 indicates a tube made preferably of metal although permissibly of other materials. 2 indicates an extension member, either tubular or solid, adapted to slide in and out of the tube 1. 3—3 are spherical hand grips, made preferably of wood, and securely fastened to 2. The dotted lines show how the member 2 is adapted to slide within 1.

Fig. 2 shows a modification. Here the tubular member 1 is made in two pieces for convenience in carrying the bar when not in use. Both parts are threadedly engaged with a short cylinder 4, which forms the joining means. A slip joint may also be used here.

In this modification, there are two sliding or adjustable members, indicated at 2—2. Each of these members is provided at its inner end with a gripping member 5. The construction of this member is shown in Figs. 5 and 6.

Figs. 3 and 4 illustrate how the left hand grip of the form shown in Fig. 1 is held in the tubular member 1. In Fig. 3, a sleeve 6, interiorly threaded for the reception of a screw 7, the head of which lies adjacent the washer 8. The sleeve 6 is also threaded into a plug 11 which fits tightly into the tube 1. Plugs 6 and 11 may be in one piece of sizes required.

The screw head is preferably sunk below the surface of the ball, as shown, and a filling piece 9 may be inserted to cover the recess. A washer 10, between the ball and the tube 1 and plug 11 serves to brace the ball against the tortional and lateral stresses. The screws are driven in only so tight as to make the ball rotatable while holding it in position in relation to member 2.

In the modified form shown in Fig. 4, the plug $12^a$—$12^b$ consists of the portion $12^b$ of such a diameter as to fit tightly into the tube 1, and of a larger diameter portion $12^a$ adapted to extend beyond the tube 1 and to be of equal outside diameter therewith.

Fig. 5 shows how the sliding or locking friction member, shown in Fig. 2 by numeral 5, is constructed.

In Fig. 5, 2 indicates a tube adapted to slide or lock within the tubular member 1. A plug 13 of the same nature as the one shown at $12^a$ and $12^b$ in Fig. 4, fits inside 2, but has a tapered portion $13^a$ extending outward from the portion of larger diameter. The tapered portion terminates in a cylindrical threaded portion $13^b$.

A cylindrical nut 15 is adapted to screw onto $13^b$ and is bored to fit the taper $13^a$. A series of slots $15^a$ are cut into the sides of the nut at the tapered portion to provide a number of spring fingers which furnish a yielding bearing against the tube member 1 when the plug and associated rods 2 are inserted into 1 as shown in Fig. 2.

Fig. 6 shows the same construction as Fig. 5 except that member 2 is in this case a solid bar and the taper portion 16 is taper threaded.

The member 2 as shown in Fig. 2 may be constructed wholly of tubular members so as to form a telescopic joint indicated at 17. The members 2 may be made telescopic in relation to each other.

The tubes 2 may be made of any flexible material or may be of stiff metal.

In operation, the bar is held like the ordinary gymnastic wand except that the balls 3 are used as grips. The members 2 may slide in and out of the tube 1 in conformity with the movement of the user. The members 2 may be locked at any distance of their length within the tube 1 by rotating them so as to tighten the nuts 15, thereby expanding them inside the tube to form a tight holding means.

I claim:—

1. An exercise bar comprising a middle tubular member, end members adapted to slide in and out of and to be locked inside the tubular member, spherical rotatable grips on each of said sliding members, and frictional spring guide means on said slidable members carried on the inner ends thereof.

2. An exercise bar comprising a tubular member having a threaded joint near its middle portion, slidable and lockable cylindrical rod members adapted to slide within said tubular members, or to be locked therein, spherical grips on the outer extremities of said slidable members and spring engaging and bearing means carried on the inner end of said slidable members.

3. In an exercise bar, a slidable and lockable member carrying on its inner end a plug inserted in said slidable member, said plug having a cylindrical threaded portion at its outer end, a tapered shoulder adjacent thereto, and a cylindrical nut adapted to fit said threaded portion and said tapered shoulder, said nut being slotted to provide spring fingers to resiliently engage the slidable member.

4. In an exercising device, a tube, rods slidably mounted therein and extensible from the ends thereof and carrying hand grips at their outer ends, and expansible members carried by the rods and expansible against the walls of the tube to retain the rods in adjusted positions.

5. In an exercising device, a tube, rotatable rods extensible from the ends of the tubes, and expansible nuts slidably arranged in the tube and associated with the rods, the expansible nuts being frictionally engageable with the walls of the tube to retain the rods in predetermined extended positions upon rotation of the rods in one direction.

6. In an exercising device, a tube, rotatable rods extensible from the ends of the tubes, expansible nuts slidably arranged in the tube and associated with the rods, the expansible nuts being frictionally engageable with the walls of the tube to retain the rods in predetermined extended positions upon rotation of the rods in one direction, and hand grips carried by the rods.

ROBERT B. McWHIRTER.